US005609936A

United States Patent [19]

Kohler et al.

[11] Patent Number: 5,609,936

[45] Date of Patent: Mar. 11, 1997

[54] DRYING SCREEN FOR PAPER MAKING MACHINE

[75] Inventors: Ernst Kohler, Eislingen; Bernd Sabrowski, Zell u.A.; Ulrich Altenhofen, Göppingen, all of Germany

[73] Assignee: Wurttembergische Filztuchfabrik D. Geschmay GmbH, Goppingen, Germany

[21] Appl. No.: 265,729

[22] Filed: Jun. 24, 1994

[51] Int. Cl.$^{6}$ .............................. B32B 5/24; B32B 31/08; B32B 31/12; B32B 33/00

[52] U.S. Cl. .......................... 428/107; 156/176; 156/181; 156/257; 156/304.6; 156/308.2; 162/207; 428/110; 428/134; 428/136

[58] Field of Search ............................... 34/623; 156/176, 156/181, 257, 304.6, 308.2; 162/207; 428/134, 136, 107, 110, 294, 296

[56] References Cited

U.S. PATENT DOCUMENTS

| | | | |
|---|---|---|---|
| 3,716,138 | 2/1973 | Lumsden | 209/401 |
| 4,731,281 | 3/1988 | Fleischer et al. | 428/196 |

FOREIGN PATENT DOCUMENTS

| | | |
|---|---|---|
| 1946982 | 4/1971 | Germany . |
| 3235468A1 | 5/1988 | Germany . |
| 5782B | 10/1988 | Germany . |
| 4139634A1 | 6/1993 | Germany . |
| 2086254A | 5/1982 | United Kingdom . |

*Primary Examiner*—James C. Cannon
*Attorney, Agent, or Firm*—Jones, Tullar & Cooper, P.C.

[57] ABSTRACT

A drying screen for paper making machines is described which comprises at least one layer of a thread composite and a thin glued-on, perforated or slit sheet i.e., with thermoplastic material-comprising filaments. The individual layers are preferably connected to one another in three layers and arranged one above the other, with the layer facing the paper web always being oriented in the direction of paper travel.

21 Claims, 1 Drawing Sheet

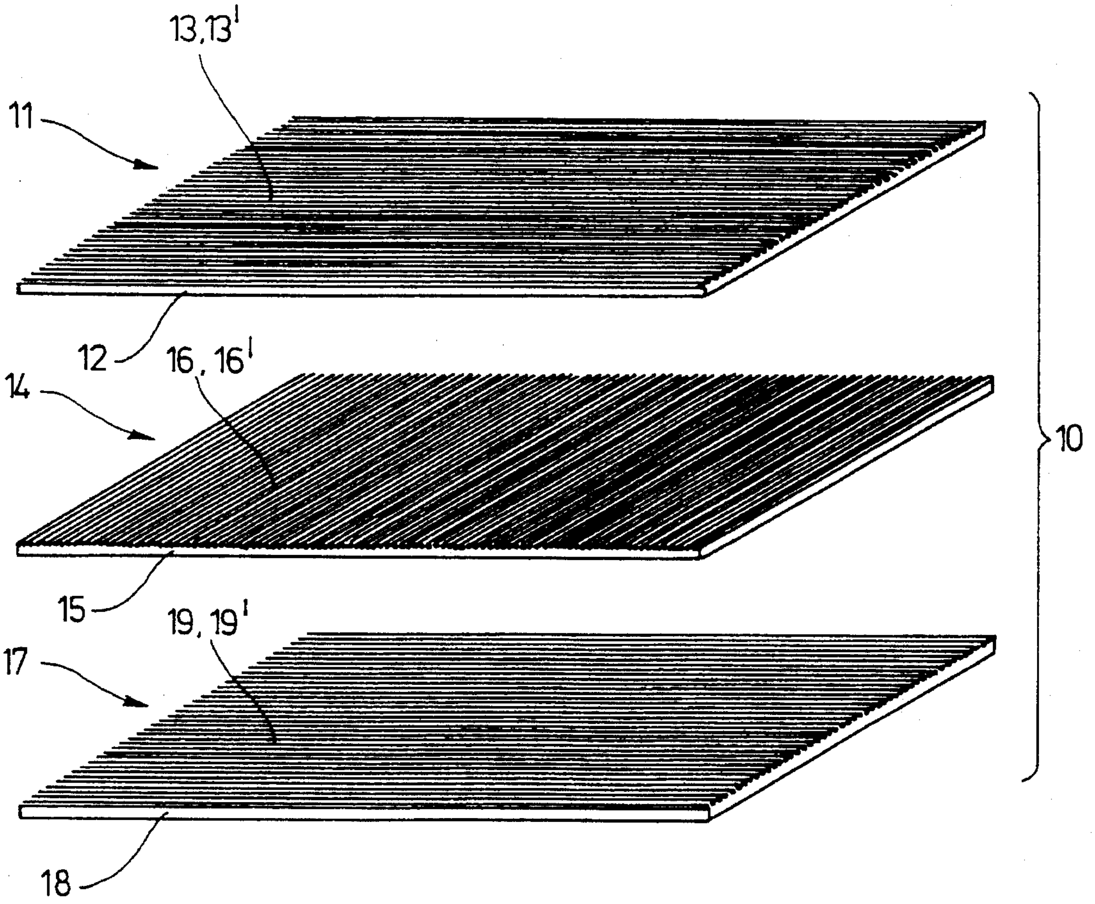
13,13'
11
12
14
16, 16'
10
15
19, 19'
17
18

DRYING SCREEN FOR PAPER MAKING MACHINE

BACKGROUND OF THE INVENTION

The present invention relates to a drying screen for drying a paper making web in the drying phase of a paper machine and to a method for manufacturing a drying screen, wherein the drying screen is provided with plastic threads.

In the drying phase of a paper making machine, i.e., after having passed through the wet end, the paper web is dried by means of contact, i.e., convection heating in a temperature range of 100° to 150° C. The paper web accompanies a so-called drying screen which rotates around a plurality of cylinders. The drying screen must be temperature resistant and must also withstand mechanical stress, especially in fast-running paper machines.

Prior art drying screens comprise either spiral wires which are connected to one another or a woven fabric of plastic filaments. These prior art drying screens are permeable to water vapor.

A drawback of the prior art drying screens is that as a result of the uneven arrangement of the wire or the yarn, the paper web does not contact the drying screen evenly but only at certain locations or lines. As a result, undesired markings are placed on the finished paper, i.e., grid-like patterns or striped patterns as impressions from the drying screen. Moreover, a smooth, even surface reduces the movement of air in the border region between paper and drying screen. The less air that is carried along, the fewer are the problems arising in regard to the covering. Moreover, the production of these prior art drying screens is time-consuming and expensive.

SUMMARY OF THE INVENTION

It is an object of the present invention to provide a drying screen of the aforementioned type which, while retaining its thermal and mechanical stability, exhibits a reduction in markings on the paper web and is less expensive to manufacture.

The solution of the problem is that the drying screen is provided with at least one layer of a thread composite i.e., with thermoplastic material-comprising material, and at least one thin sheet, with at least one side of the thread composite being fixed to the thin sheet.

The drying screen according to the present invention is provided with a very large contact surface for the contacting paper web, since the individual threads, in contrast to a woven fabric, are not crimped and extend with their entire length over the surface. This makes the paper web less susceptible to marks.

The thread composite may be single or multi-layered, preferably with a two or three-layer thread composite. To obtain lateral stability, the thread composite facing the paper web i.e., the filaments extend preferably in the longitudinal direction, and the thread composite below extends preferably in the transverse direction. In three-layer thread composites a third thread composite, extending in the longitudinal direction is advantageously provided. The advantage of this is that the transverse threads are not displaced when they roll over the dry phase cylinders of the paper making machine. Such displacement is liable to occur since often only one cylinder in the cylinder system is driven, and the drying screen serves, in effect, as a driving belt for the remaining cylinders.

Another embodiment provides that under the thread composite facing the paper web and extending lengthwise, two thread composites are arranged which extend diagonally crosswise and form a 20° to 70° angle to the direction of travel. However, a different supporting material may also follow, for example, a woven fabric.

BRIEF DESCRIPTION OF THE DRAWING

The sole figure is an exploded view of a screen according to the present invention.

DETAILED DESCRIPTION

Thirty-two polyester threads 13', each coated with a polyester hot-melt-adhesive and adjacent to one another, are wound in the form of a strand onto a cylinder, which can be heated to exceed 150° C., and onto a cold cylinder. The cylinders have a diameter of approximately 100 cm and are arranged at a distance of approximately 15 m from one another. There are no overlaps in the resulting endless thread composite. A slit, reactive polyurethane adhesive sheet 12 is applied to the thread composite and is then hardened at 200° C.

The finished drying screen 10 is assembled by means of three thread composites 13, 16, 19 manufactured in this manner. This type of drying screen 10 is significantly faster to manufacture (several hours, compared to several days for woven drying screens) and it is less expensive to make than prior art drying screens. Moreover, the permeability can be adjusted precisely and remains constant as a result of the number and the size of the slits in the sheet. The upper thread composite 13 forms a relatively even contact surface over the entire surface of the paper web such that the tendency for markings is significantly reduced.

In general, all plastics producing a fiber of high tensile strength, that are capable of being spun, and are temperature and vapor resistant, are suitable as material for threads of the thread composite. The softening temperature of the plastic used should not be below 150° C. and preferably exceed 200° C. The tensile strength of the filaments should be at least 3 cN/dtex, preferably exceeding 4 cN/dtex. Stabilized polyesters are primarily suitable, preferably polyethyleneterephthalate (PETP), a plurality of polyamides (PA) such as polyamide 6, polyamide 6,6, polyamide 12, polyamide 6,10, polyamide 6,12, polyamide 4.6, and additionally polyphenylene sulfides (PPS) or polyetheretherketone (PEEK), but also polyaramides, especially, poly-n-phenylene isophthalamide or poly-p-phenylene terephthalamide. For plastics having aromatic or heterocyclic monomers, the following are suitable: polycarbonates, polyaminotriazole, polytriazole, polybenzimidazole, polybenzoxazole, polyquinolizine or polyoxydiazole and polyoxythiadiazole. Polyfluoralkylene and polytetrafluorethylene (PTFE) may also be used. Mineral filaments, glass filaments, etc., are also suited for this process. Carbon fibers, which exhibit very high tensile strength, may also be used instead of plastic fibers. Carbon fibers are very difficult to spin, because their shearing strength is too low so that they would break during weaving. However, they may be made into thread composites without any problem. For lateral transverse stability, the carbon fibers are preferably provided with a thermofixing resin finish, for example, epoxy resin.

The threads for the thread composite should preferably be either slightly adhesive or be finished with an adhesive, for example, resin. As a result, they adhere to one another somewhat during the production of the thread composite and prior to being fixed to the thin sheet. The glue is preferably an adhesive agent, for example, epoxy resin; however, it may also be a hot-melt-type adhesive. For example, dispersions of polyacrylesters, polyvinylidene chloride, polyvinyl acetate or propionate, or strewable thermoplastic plastic powders may be used.

The threads or filaments for the thread composite may have a round or oval cross section. Flat materials and super flat materials having a cross section of 1.2 mm×0.2 mm may also be used.

Polyurethane or polypropylene sheets which can be precipitation-hardened, may also be used. Other suitable sheets are: cross-linked polyethylene or polypropylene sheets and polycarbonate, polyvinylidene chloride, polytetrafluorethylene, polyethylene terephthalate or polyamide sheets may be used. The sheet that is used should basically be able to be activatated by heat such that it adheres and hardens during its application to the thread composite and is subsequently temperature-stable at a temperature of at least 150°. Sheets that are thermally cross-linkable are preferred (polyethylene, polypropylene, polyurethane, polyamide). Due to the use of copolymers, the melting point may be adjusted to the requirements of the production process.

Another option is to apply an adhesive that can be hardened to a non-adhesive sheet to which the thread composite is then fixed.

It is advantageous to use a perforated or slit sheet such that water and vapor permeability is ensured. The permeability of the drying screen may then be precisely adjusted in this manner also.

It is especially advantageous for the melting sheet to be in the form of a compound material, with fibers, especially aramide fibers or filaments, carbon fibers, glass fibers, and mineral fibers being incorporated into the sheet. The result is improved shearing strength or resistance.

The drying screen 10 may be designed as an endless screen or as an open, especially closeable, screen.

The drying screen according to the present invention is manufactured by winding the threads or filaments onto cylinders. The threads may be provided with the adhesive finish prior to winding, unless they themselves become slightly adhesive at higher temperatures. They may be coated, submerged or dipped, for example, into a hot-melt-type adhesive. The adhesive agent may also be added during the winding process, with the threads being electrostatically charged and the adhesive agent being sprayed on or applied in the form of powder. Another alternative is to spin or twist a second thread around the threads, which itself becomes adhesive at higher temperatures. The increase in temperature is the result of heating the cylinders to temperatures above 150° C. The adhesive sheet is subsequently applied to the thread composite such that it becomes fixed.

Another method provides for the thread composite to be wound onto a thin supporting sheet. The thin supporting sheet may additionally carry a reactive adhesive, i.e., the phases of the method may be reversed without any problem.

In order to increase the shearing strength, a compound sheet may be used into which, for example, aramide, glass, carbon fibers, and mineral fibers are incorporated.

If the threads are wound before the sheet is applied, the threads are stationary and the cylinders onto which they are wound can be rotated. If the threads are to be wound onto a thin supporting sheet, the cylinders are stationary and the threads are fed over a slowly moving slide.

Another advantageous modification provides for the fixating adhesive sheet to include the thread composite extending transversely.

If a pure adhesive sheet is used for fixing, a protective sheet should be inserted between it and the cylinders such that the cylinders do not become glued together. Another option is to provide a compound sheet whose one side is adhesive and whose other side is protective.

According to one aspect of the present invention, the drying screen 10 is provided with at least one layer 11, 14 or 17, of the thread composite 13, 16 or 19, and at least one thin sheet 12, 15 or 18 with at least one side of the thread composite 13, 16 or 19 being fixed to the thin sheet 12, 15 or 18.

We claim:

1. A drying screen for use in the drying section of a papermaking machine which comprises a thin, perforated or slit polymeric supporting sheet adhesively associated with an outermost non-woven layer composed of mutually parallel thermoplastic material-comprising filaments which are heat-bonded to one another to form what is intended to be a paper-contacting layer having improved smoothness across the entire outermost surface thereof which will enable the production of paper characterized by reduced surface marking.

2. The drying screen according to claim 1, which further comprises an additional layer of mutually parallel thermoplastic material—comprising filaments, with the paper contacting thermoplastic material—comprising filaments being oriented in the direction of paper travel and the thermoplastic material—comprising filaments of the additional layer being oriented transverse to the direction of paper travel.

3. The drying screen according to claim 2, which further comprises a further additional layer of mutually parallel material—comprising filaments with the paper contacting thermoplastic material—comprising filaments and the thermoplastic material—comprising filaments of the further additional layer being oriented in the direction of paper travel, and the thermoplastic material—comprising filaments of the additional layer being oriented transverse to the direction of paper travel.

4. The drying screen according to claim 1, wherein said screen comprises three layers, with the layer facing the paper web being oriented in the direction of paper travel and the two layers lying underneath are oriented diagonally crossing one another at an angle of 20° to 70° in the direction of paper travel.

5. The drying screen according to claim 1, wherein a woven fabric is provided on the machine side and/or between the individual layers.

6. The drying screen according to claim 1, wherein a thread is twisted and/or spun around the thermoplastic material—comprising filaments.

7. The drying screen according to claim 1, wherein the thermoplastic material—comprising filaments are made of stabilized polyesters, especially polyethyleneterephthalate, polyamides, especially polyamide 6, polyamide 6,6, polyamide 6,10, polyamide 4,6, polyamide 6,12, polyamide 12, polyphenylene sulfides, polyetherketones, especially, polyetheretherketones, polyfluoralkenylenes, polyaramides, polyheterocyclenes, polycarbonates, carbon fibers, glass fibers or mineral fibers.

8. The drying screen according to claim 1, wherein the thermoplastic material—comprising filaments are finished to be adhesive, especially finished with resin, or a fiber having a low fusion point is spun around them.

9. The drying screen according to claim 1, wherein the cross section of the thermoplastic material—comprising filaments is round, oval, flat or ultraflat, especially having a height-width ratio ranging from 2:1 to 10:1, preferably 6:1.

10. The drying screen according to claim 1, wherein the thin polyeric supporting sheet is an adhesive sheet of reactive polyurethane, reactive polypropylene, cross-linked polypropylene, cross-linked polyethylene, polycarbonate, polyvinylidene chloride, polytetrafluorethylene, polyethyleneterphthalate or polyamide.

11. The drying screen according to claim 10, wherein a non-adhesive protective sheet is applied to the adhesive sheet, or wherein an adhesive is applied to a thin non-adhesive sheet.

12. The drying screen according to claim 1, wherein the thin polymeric supporting sheet is perforated or slit.

13. The drying screen according to claim 1, wherein at least one thin polymeric supporting sheet is in the form of a compound sheet having integrated high-temperature resistant fibers, especially aramide fibers, glass fibers, carbon fibers, PEEK, mineral fibers, etc.

14. A method of forming a drying screen for use in the dryer section of a papermaking machine which comprises heat-bonding a mutually parallel array of thermoplastic material-comprising filaments to one another and adhesively associating a thin, perforated or slit polymeric supporting sheet with said heat-bonded mutually parallel array of thermoplastic material-comprising filaments to form a laminate wherein the heat-bonded, mutually parallel array of thermoplastic material-comprising filaments provides a smooth surface across an entire outer laminate face, said smooth face intended to be the paper-contacting surface in the dryer section of said papermaking machine which will enable the production of paper characterized by reduced surface marking.

15. The method according to claim 14, wherein the thermoplastic material—comprising filaments are wound around a thin supporting sheet rotating around cylinders.

16. The method according to claim 14, wherein the thermoplastic material—comprising filaments in the parallel arrangement are placed separate from one another at defined distances with the help of machine members.

17. The method according to claim 15, wherein the form of the composite of the thermoplastic material—comprising filaments is stabilized by means of a partial coating or by gluing.

18. The method according to claim 17, wherein after the pre-fabricated composite of the thermoplastic material—comprising filaments, especially the partially coated or partially glued composite of the thermoplastic material—comprising filaments, is obtained, a complete coating, for example, of polyurethane, is achieved.

19. The method according to claim 18, wherein the coated woven fabric or composite of the thermoplastic material—comprising filaments is perforated in a defined manner.

20. The method according to claim 19, wherein the composite of the thermoplastic material—comprising filaments are recessed by the perforation.

21. The method according to claim 14, wherein the composite of the thermoplastic material—comprising filaments is manufactured without a back cloth, subcomposite or the like.

* * * * *